United States Patent Office 3,518,257
Patented June 30, 1970

3,518,257
NOVEL NITROFURAN DERIVATIVES AND
PROCESS FOR THEIR PREPARATION
Shinsaku Minami, 31 4-chome, Yanagi, Yamato Kouri-
 yama-shi, Nara-ken, Japan, and Masanao Shimizu, 1–29
 2-chome, Sumahonmachi, Suma-ku, Kobe, Japan
No Drawing. Filed Nov. 1, 1966, Ser. No. 591,139
Claims priority, application Japan, Nov. 15, 1965,
40/70,113
Int. Cl. C07d 31/28
U.S. Cl. 260—240                                      8 Claims

ABSTRACT OF THE DISCLOSURE

Novel compounds having excellent antimicrobial activities of the formula

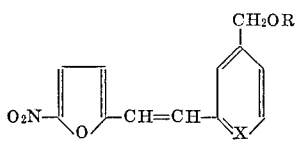

wherein X represents a member selected from the group consisting of N and N—O, and R represents a member selected from the group consisting of hydrogen and lower alkanoyl. Such compounds are produced by heating the corresponding N-oxide with a lower fatty acid anhydride to a temperature of at least 90° C.

This invention relates to novel nitrofuran derivatives and a process for their preparation.

It is disclosed in the copending application of U.S. Ser. No. 473,166, filed July 19, 1965 by the inventors of this invention that 2-[2-(5-nitro-2-furyl)vinyl]-pyridine in which 5- or 6-position of a pyridine ring is substituted by a hydroxyl or alkanoyloxymethyl radical, and N-oxides thereof have excellent antimicrobial activities.

According to this invention, it is also found that 2-[2-(5 - nitro - 2-furyl)vinyl]-4-hydroxymethyl, or -alkanoyl-oxymethylpyridines and N-oxides thereof represented by the general formula:

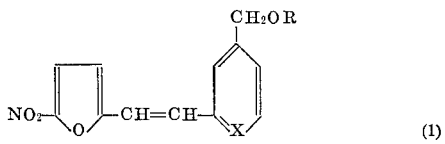

have excellent antimicrobial activities. In the above Formula 1, X represents a member selected from the group consisting of N and N→O, and R represents a member selected from the group consisting of hydrogen and lower alkanoyl such as acetyl and propionyl.

Examples of 2-[2-(5-nitro-2-furyl)vinyl]-pyridines and N-oxides thereof represented by the above Formula 1 include 2-[2-(5 - nitro-2-furyl)vinyl]-4-hydroxymethylpyridine N-oxide, -4-acetoxymethylpyridine N-oxide, -4-hydroxymethylpyridine, -4 - acetoxymethylpyridine, -4-propionyloxymethylpyridine and the like.

According to this invention, a compound represented by the above Formula 1 is prepared by the method comprising heating 2-[2-(5-nitro-2-furyl)vinyl]-4 - methylpyridine N-oxide in the presence of a lower fatty acid anhydride and, if desired, hydrolyzing and/or oxidizing the resulting product. The reaction of 2-[2-(5-nitro-2-furyl)-vinyl]-4-methylpyridine N-oxide with a lower fatty acid anhydride such as acetic anhydride and propionic anhydride can be explained by the following chemical formulae, in which acetic anhydride is used for the illustration.

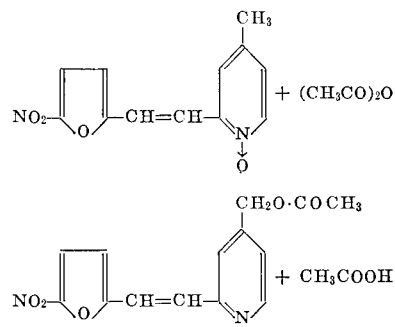

This rearrangement reaction can be performed by heating the reactants in an inert solvent such as acetic acid and toluene. Whereas, it can also be performed with advantage by heating the N-oxide with an excess of acid anhydride to a temperature of, say, at lowest 90° C. The starting material, i.e., 2 - [2-(5-nitro - 2 - furyl)vinyl]-4-methylpyridine N-oxide can be readily prepared by oxidation with hydrogen peroxide in glacial acetic acid of 2-[2-(5 - nitro-2-furyl)vinyl]-4-methylpyridine or condensation of 5-nitrofurfural with 2,4-dimethylpyridine N-oxide.

The above rearrangement reaction product can be converted to the corresponding hydroxymethyl compound or N-oxide compound by hydrolysis and/or oxidation known per se, if so desired. For hydrolyzing lower alkanoyloxymethyl compound into corresponding hydroxymethyl compound, such known acidic hydrolyzing agent such as sulfuric acid, phosphoric acid, hydrogen halide and organic acids can be advantageously used. Although basic hydrolyzing agents such as caustic soda and sodium carbonate are also effective, the use thereof does not give a good result in yield of the product. This hydrolysis can be performed in an inert solvent such as alcohol and dioxane. It can be successfully accelerated by heating.

The pyridine compounds of the Formula 1 in which X is N can be oxidized to the corresponding N-oxide compounds by the means known per se. This oxidation can be performed, for example, by oxidizing the pyridine compound at room temperature or at an elevated temperature, with a known, suitable oxidizing agent such as hydrogen peroxide and organic peroxides. While such an oxidation may be performed in an inert solvent such as water and alcohol, it is found that the preferred practice is to perform the oxidation in glacial acetic acid with hydrogen peroxide.

The novel compounds of this invention, having excellent antibacterial, antifungal and antiprotozoal activities, are useful compounds applicable not only to the human being and animals but also to the fields of food and agriculture. The compounds in accordance with this invention exhibit especially strong in vitro activities against gram positive bacteria such as Staphylococcus aureus, Diplococcus pneumoniae I, Bacillus subtilis and Listeria monocytogenes; gram negative bacteria such as Escherichia coli, Shigella flexneri, Shigella sonnei, Salmonella typhimurium, Proteus vulgaris, Klebsiella pneumoniae and Brucella abortus; fungi such as Candida albicans, Trichophyton asteroides, Aspergillus fumigatus, Aspergillus terreus, Cryptococcuc neoformans, Microsporum gypseum, Trichophyton interdigitale and Epidermophyton floccosum and Protozoa such as Trichomonas vaginalis.

The following examples are given for the explanation of this invention.

EXAMPLE 1

A process for preparing 2-[2-(5-nitro-2-furyl)-vinyl]4-acetoxymethylpyridine.

2.46 g. of 2-[2-(5-nitro-2-furyl)vinyl]-4-methylpyridine N-oxide and 20 ml. of acetic anhydride were reacted for one hour at 110–115° C. under preventing atmospheric moisture. Then the acetic anhydride was distilled off under reduced pressure and the residue was extracted with 50 ml. of hot methanol. After the insoluble materials in methanol being separated by filtration, the methanolic filtrate was distilled off. The precipitated crystals were recrystallized from methanol and acetone to yield 0.7 g. of the objective product having a melting point of 151–152° C.

The same treatment was carried out by using propionic anhydride in lieu of acetic anhydride in this example and then 2-[2-(5-nitro-2-furyl)vinyl]-4-propionyloxymethylpyridine was obtained. The melting point of this product is 120–122° C.

EXAMPLE 2

A process for preparing 2-[2-(5-nitro-2-furyl)vinyl]-4-hydroxymethylpyridine.

0.5 g. of 2-[2-(5-nitro-2-furyl)vinyl]-4-acetoxymethylpyridine were added to 10 ml. of 10% hydrochloric acid and heated for one hour on a water bath, and then the reaction mixture was made alkaline with aqueous sodium bicarbonate, and the resultant crystalline precipitate was separated by filtration, washed with water and recrystallized from acetonitrile. 0.2 g. of the objective product having a melting point of 203–204° C. (decomposition) was obtained.

EXAMPLE 3

A process for preparing 2-[2-(5-nitro-2-furyl)vinyl]-4-acetoxymethylpyridine N-oxide.

5.7 g. of 2-[2-(5-nitro-2-furyl)vinyl]-4-acetoxymethylpyridine were dissolved in 100 ml. of glacial acetic acid, to which half of 20 ml. of 34% aqueous hydrogen peroxide were added with stirring at 70° C. After reaction for 5 hours at same temperature, the remaining half of the above aqueous hydrogen peroxide were added to the mixture and reacted for further 10 hours, following which the glacial acetic acid was distilled off under reduced pressure at 70° C. 50 ml. of water was added to the residue and mixture was neutralized with sodium bicarbonate. The resultant crystals were recrystallized from acetonitrile to give 3 g. of the objective product having a melting point of 188–189° C.

In the same manner, the oxidation treatment was given to 2-[2-(5-nitro-2-furyl)vinyl]-4-hydroxymethylpyridine to yield 2-[2-(5-nitro-2-furyl)vinyl]-4-hydroxymethylpyridine N-oxide having a melting point of 217–218° C. (decomposition).

EXAMPLE 4

This example is given for explaining the excellent antimicrobial activities of the compounds in this invention.

The following Table I summarises the activities in vitro of the compounds of this invention against a variety of microorganisms. The minimum inhibitory concentration (MIC) was determined by the well-known serial dilution technique.

In the following Table I, compounds 1 to 5 are the compounds as identified below.

Compound 1: 2-[2-(5-nitro-2-furyl)vinyl]-4-acetoxymethylpyridine.
Compound 2: 2-[2-(5-nitro-2-furyl)vinyl]-4-propionyloxymethylpyridine.
Compound 3: 2-[2-(5-nitro-2-furyl)vinyl]-4-hydroxymethylpyridine.
Compound 4: 2-[2-(5-nitro-2-furyl)vinyl]-4-acetoxymethylpyridine N-oxide.
Compound 5: 2-[2-(5-nitro-2-furyl)vinyl]-4-hydroxymethylpyridine N-oxide.

TABLE I.—ANTIMICROBIAL ACTIVITY IN VITRO (MIC: MCG./ML.)

| Organisms | Compounds | | | | |
|---|---|---|---|---|---|
| | 1 | 2 | 3 | 4 | 5 |
| Staphylococcus aureus | 1 | 0.3 | 1 | 1 | 0.3 |
| Diplococcus pneumoniae I | 3 | 0.3 | | 1 | 10 |
| Bacillus subtilis | 0.03 | 0.003 | | 0.03 | 0.01 |
| Listeria monocytogenes | 3 | 0.03 | | 1 | 1 |
| Escherichia coli | 0.3 | 0.3 | 0.3 | 0.3 | 1 |
| Shigella flexneri | 3 | 1 | 30 | 1 | 3 |
| Shigella sonnei | 1 | 0.3 | | 0.3 | 0.3 |
| Salmonella typhimurium | 1 | 0.1 | | 0.1 | 1 |
| Proteus vulgaris | 10 | 3 | | 3 | 10 |
| Klebsiella pneumoniae | 0.3 | 0.03 | | 0.1 | 0.1 |
| Brucella abortus | 10 | 3 | | 10 | 10 |
| Candida albicans | 0.3 | 1 | 1 | 30 | 10 |
| Trichophyton asteroides | 1 | 3 | 3 | 30 | 30 |
| Aspergillus fumigatus | 1 | 3 | 3 | | |
| Aspergillus terreus | 3 | >100 | 3 | | |
| Crytococcus neoformans | 0.3 | 0.3 | 1 | | |
| Microsporum gypseum | 1 | 1 | 1 | | |
| Trichophyton interdigitale | 3 | 3 | 3 | | |
| Epidermophyton floccosum | 0.3 | 0.3 | 1 | | |
| Trichomonas vaginalis | 0.1 | 0.1 | 0.3 | 3 | 1 |

We claim:
1. A compound of the formula:

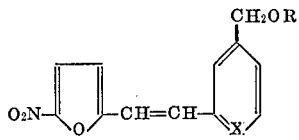

wherein X represents a member selected from the group consisting of N and N→O, and R represents a member selected from the group consisting of hydrogen and lower alkanoyl.

2. 2 - [2 - (5 - nitro - 2 - furyl)vinyl] - 4 - acetoxymethylpyridine.

3. 2 - [2 - (5 - nitro - 2 - furyl)vinyl] - 4 - propionyloxymethylpyridine.

4. 2 - [2 - (5 - nitro - 2 - furyl)vinyl] - 4 - hydroxymethylpyridine.

5. 2 - [2 - (5 - nitro - 2 - furyl)vinyl] - 4 - acetoxymethylpyridine N-oxide.

6. 2 - [2 - (5 - nitro - 2 - furyl)vinyl] - 4 - hydroxymethyl N-oxide.

7. Process for the preparation of 2 - [2 - (5 - nitro - 2 - furyl)vinyl] - 4 - lower alkanoyloxymethylpyridine which comprises heating 2 - [2 - (5 - nitro - 2 - furyl)vinyl] - 4 - methylpyridine N-oxide with a lower fatty acid anhydride to a temperature of at least 90° C.

8. Process for the preparation of 2 - [2 - (5 - nitro - 2 - furyl)vinyl] - 4 - hydroxymethylpyridine which comprises heating 2 - [2 - (5 - nitro - 2 - furyl)vinyl] - 4 - methylpyridine N-oxide with a lower fatty acid anhydride to a temperature of at least 90° C., and hydrolyzing the resulting compound.

References Cited

UNITED STATES PATENTS 3,414,567  12/1968  Minami et al. _____ 260—240

OTHER REFERENCES

Fujita et al.: J. Pharm. Soc. Japan, vol. 86, pages 1014 to 1021 (Oct. 21, 1966).

JOHN D. RANDOLPH, Primary Examiner

U.S. Cl. X.R.

424—263